(12) United States Patent
Mora Flores et al.

(10) Patent No.: US 11,097,864 B2
(45) Date of Patent: Aug. 24, 2021

(54) HORIZONTAL-TYPE AUTOMATIC PACKAGING MACHINE

(71) Applicant: MESPACK, SL, Santa Perpetua de Mogoda (ES)

(72) Inventors: Francisco Mora Flores, Mollet del Valles (ES); Josep Sola Gil, Vacarisses (ES)

(*) Notice: Subject to any disclaimer, the term of this patent is extended or adjusted under 35 U.S.C. 154(b) by 251 days.

(21) Appl. No.: 16/348,525

(22) PCT Filed: Sep. 27, 2017

(86) PCT No.: PCT/IB2017/055889
§ 371 (c)(1),
(2) Date: May 9, 2019

(87) PCT Pub. No.: WO2018/087611
PCT Pub. Date: May 17, 2018

(65) Prior Publication Data
US 2019/0375530 A1    Dec. 12, 2019

(30) Foreign Application Priority Data
Nov. 10, 2016   (EP) .................................. 16382520

(51) Int. Cl.
*B65B 43/46* (2006.01)
*B65B 43/12* (2006.01)
(Continued)

(52) U.S. Cl.
CPC ............ *B65B 43/465* (2013.01); *B65B 43/12* (2013.01); *B65B 43/30* (2013.01); *B65B 43/54* (2013.01);
(Continued)

(58) Field of Classification Search
CPC ....... B65B 43/30; B65B 43/32; B65B 43/465; B65B 43/54; B65B 43/12; B65B 43/314;
(Continued)

(56) References Cited

U.S. PATENT DOCUMENTS 6,662,532 B1 * 12/2003 Droog ..................... B65B 43/36
53/373.6
2013/0232915 A1 * 9/2013 Salas ....................... B65B 43/12
53/389.1
(Continued)

FOREIGN PATENT DOCUMENTS

| EP | 2522584 A1 | 11/2012 | |
| EP | 2522584 A1 * | 11/2014 | ............ B65B 43/12 |
| ES | 2395263 A1 | 2/2013 | |

*Primary Examiner* — Andrew M Tecco
*Assistant Examiner* — Nicholas E Igbokwe
(74) *Attorney, Agent, or Firm* — Eugenio J. Torres-Oyola; Victor M. Rodriguez-Reyes; Rafael Rodriguez-Muriel

(57) ABSTRACT

The horizontal-type automatic packaging machine comprises a conveyor moving a plurality of gripper-holding carriages (4) in an advancing direction (D) along a closed path. Each gripper-holding carriage (4) comprises a base structure (7) connected to the conveyor (2) and two parallel gripper arms (8a, 8b) carrying two or more pairs of grippers (47a, 47b) for holding two or more flexible packages (50) arranged in parallel. The gripper arms (8a, 8b) are guided for moving parallel to the advancing direction (D), moving one closer to the other for opening the packages and moving one away from the other for closing the packages due to the action of a driving mechanism connected to proximal ends (17a, 17b) of the gripper arms. A mechanical transmission transmits the movement of the proximal ends (17a, 17b) to distal ends (18a, 18b) of the gripper arms (8a, 8b).

15 Claims, 8 Drawing Sheets

(51) Int. Cl.
*B65B 43/30* (2006.01)
*B65B 43/54* (2006.01)
*B65G 35/06* (2006.01)

(52) U.S. Cl.
CPC .... *B65G 35/066* (2013.01); *B65G 2201/0238* (2013.01)

(58) Field of Classification Search
CPC ......... B65B 43/16; B65B 43/14; B65B 43/26; B65B 43/28; B65B 43/52; B65G 2201/0238; B65G 35/066
See application file for complete search history.

(56) References Cited

U.S. PATENT DOCUMENTS

| | | | |
|---|---|---|---|
| 2016/0083130 A1* | 3/2016 | Garriga Jimenez | B65B 61/06 53/545 |
| 2016/0122063 A1* | 5/2016 | Garriga Jimenez | B65G 54/02 53/551 |
| 2017/0361967 A1* | 12/2017 | Campagnoli | B65B 43/465 |

* cited by examiner

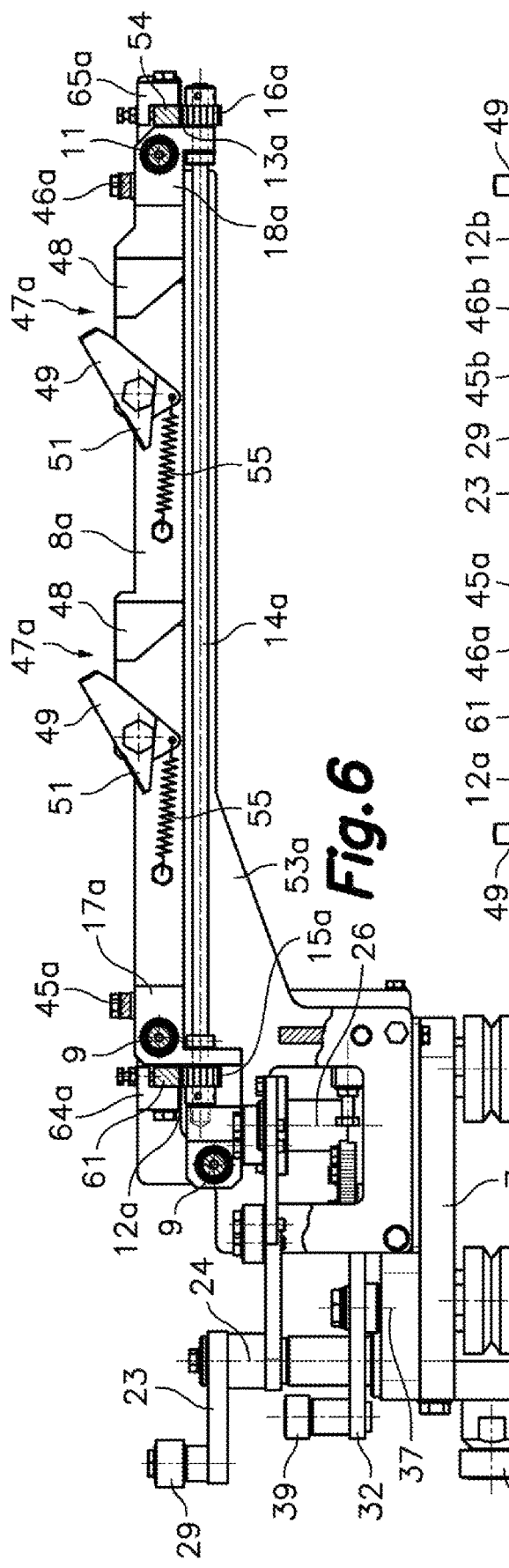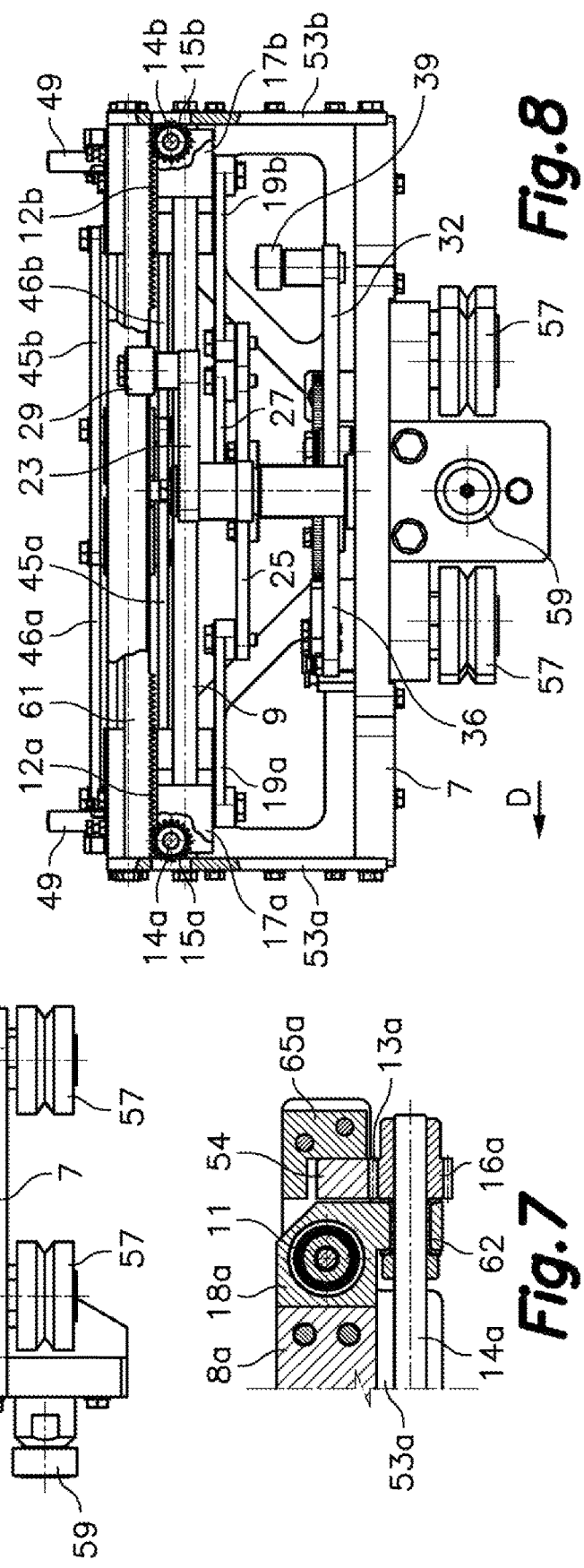

HORIZONTAL-TYPE AUTOMATIC PACKAGING MACHINE

FIELD OF THE ART

The present invention relates to a horizontal-type automatic packaging machine envisaged for filling and sealing flexible pouch-type packages.

BACKGROUND OF THE INVENTION

Horizontal automatic packaging machines are known to comprise a package supplying unit, one or more filling stations, one or more sealing stations, an output unit, and a conveyor moving a plurality of gripper-holding carriages in an advancing direction along a closed path having a working section and a return section, wherein the package supplying unit supplies empty flexible packages to the gripper-holding carriages at the beginning of the working section, the filling stations and the sealing stations fill and seal the flexible packages, respectively, as they travel along the working section, and the output unit receives the filled and sealed flexible packages which are delivered by the gripper-holding carriages at the end of the working section.

Document EP 2522584 A1 discloses one of these horizontal automatic packaging machines, in which each of the gripper-holding carriages comprises a base structure connected to the conveyor, a pair of left and right gripper arms perpendicular to the advancing direction of the conveyor and extending from the base structure, wherein the left and right gripper arms have respective proximal ends slidingly coupled to a pair of proximal horizontal guides parallel to the advancing direction fixed to the base structure and respective distal free ends. The left and right gripper arms support two pairs of left and right grippers which can be operated for holding two flexible packages arranged in parallel. Installed in the base structure there is a driving mechanism connected to the left and right proximal ends of the left and right gripper arms. When this driving mechanism is operated, it moves the left and right gripper arms in opposite directions in relation to the base structure, moving one closer to the other for opening the flexible packages and moving one away from the other for closing the flexible packages.

One drawback of the machine described in the cited document EP 2522584 A1 is that since the left and right gripper arms are supported in cantilever fashion, guided and operated at their proximal ends, any play between the guides and the proximal ends of the gripper arms or any elasticity in the gripper arms can lead to the left and right gripper arms no longer being parallel, resulting in a lack of uniformity in the opening and closing of the flexible packages supported by the gripper-holding carriage.

DISCLOSURE OF THE INVENTION

The present invention contributes to solve the aforementioned and others drawbacks by providing a horizontal-type automatic packaging machine comprising a conveyor moving a plurality of gripper-holding carriages in an advancing direction along a closed path having a working section and a return section, a package supplying unit supplying empty flexible packages to the gripper-holding carriages at the beginning of the working section, at least one filling station and at least one sealing station filling and sealing the flexible packages, respectively, in the working section, and an output unit receiving the filled and sealed flexible packages delivered by the gripper-holding carriages at the end of the working section.

The conveyor moves the gripper-holding carriages intermittently with stops in the filling and sealing stations, or alternatively the conveyor moves the gripper-holding carriages continuously and uniformly and the filling and sealing stations move back and forth in the advancing direction, along with the gripper-holding carriages, and in an opposite backwards direction.

Each of the gripper-holding carriages comprises a base structure connected to the conveyor, a pair of left and right gripper arms extending from the base structure perpendicular to the advancing direction, and two or more pairs of left and right grippers mounted in the left and right gripper arms. The left and right grippers can be operated automatically and are arranged such that they can hold two or more flexible packages arranged in parallel.

Each flexible package comprises two facing flexible walls and has a closed bottom, closed lateral edges, and an upper opening. Each pair of left and right grippers is configured and arranged for supporting a flexible package by grabbing it by its opposite lateral edges in positions close to the upper opening. Arranging the flexible packages "in parallel" is interpreted as an arrangement in which two or more flexible packages have their respective flexible walls facing one another and arranged in separate planes parallel to one another.

The left and right gripper arms have respective left and right proximal ends and respective left and right distal ends. The left and right proximal ends are slidingly coupled to one or more proximal horizontal guides parallel to the advancing direction fixed to the base structure.

Each gripper-holding carriage further comprises a driving mechanism connected to the left and right proximal ends of the left and right gripper arms. When the driving mechanism is operated, it moves the left and right gripper arms in opposite directions in relation to the base structure, moving one closer to the other for opening the upper opening of the flexible packages and moving one away from the other for closing the upper opening of the flexible packages.

The base structure comprises an extension frame which in one embodiment comprises two left and right longitudinal members and a distal crosspiece. The two left and right longitudinal members are parallel to the left and right gripper arms and have proximal ends fixed to the base structure and distal ends fixed to opposite ends of the crosspiece. The left and right longitudinal members are arranged in outer sides of the left and right gripper arms, whereby the extension frame externally surrounds the left and right gripper arms.

The extension frame supports at least one distal horizontal guide parallel to the advancing direction, and the left and right distal ends of the left and right gripper arms are slidingly coupled to this distal horizontal guide. The driving mechanism comprises a mechanical movement transmission transmitting the movement of the left and right proximal ends of the left and right gripper arms with respect to the base structure to the respective left and right distal ends of the left and right gripper arms with respect to the extension frame.

Thus, the left proximal and distal ends of the left gripper arm and the right proximal and distal ends of the right gripper arm are driven by the driving mechanism, including the mechanical movement transmission, to be moved simultaneously and in opposite directions along the proximal and distal horizontal guides, which assures that the left and right gripper arms are perfectly parallel to one another in any position and during their movements along the horizontal guides, providing uniformity in the opening and closing of the flexible packages supported by the gripper-holding carriage.

In a preferred embodiment, the mechanical movement transmission comprises a pair of left and right proximal racks, a pair of left and right distal racks, a pair of left and right transmission shafts, a pair of left and right proximal pinions, and a pair of left and right distal pinions. The left proximal and distal pinions have the same diameter and the right proximal and distal pinions have the same diameter.

The pair of left and right proximal racks are fixed to the base structure in positions parallel to the advancing direction and adjacent to the left and right proximal ends of the left and right gripper arms, and the pair of left and right distal racks are fixed to the extension frame in positions parallel to the advancing direction and adjacent to the left and right distal ends of the left and right gripper arms.

The left transmission shaft is installed in the left gripper arm in a rotational manner about an axis perpendicular to the advancing direction and has the left proximal pinion and the left distal pinion fixed thereto. The right transmission shaft is installed in the right gripper arm in a rotational manner about an axis perpendicular to the advancing direction and has the right proximal pinion and the right distal pinion fixed thereto. The left proximal and distal pinions are meshed with the left proximal and distal racks, respectively, and the right proximal and distal pinions are meshed with the right proximal and distal racks, respectively.

With this arrangement, the linear movements imparted by the driving mechanism to the left and right proximal ends of the left and right gripper arms along the proximal horizontal guide are converted, as a result of the left and right proximal pinions meshing with the left and right proximal racks, into rotational movements of the left and right transmission shafts, and these rotational movements of the left and right transmission shafts are converted, as a result of the left and right distal pinions meshing with the left and right distal racks, into equivalent linear movements of the left and right distal ends of the left and right gripper arms along the distal horizontal guide.

In one embodiment, the driving mechanism comprises a driving lever mounted in the base structure in a rotational manner about a first vertical axis, a primary transmission transmitting a rotation of the driving lever to a pivoting element mounted in the base structure in a rotational manner about a second vertical axis, and a secondary transmission converting a rotation of the pivoting element into linear back and forth movements of the left and right gripper arms along the proximal and distal horizontal guides between a closing position and an opening position.

The secondary transmission can comprise, for example, a pair of left and right link rods having first ends connected in an articulated manner by respective pins to points of the pivoting element located on opposite sides of the second vertical axis and second ends connected in an articulated manner by respective pins to the left and right proximal ends of the left and right gripper arms.

The primary transmission can comprise, for example, a transmission lever rotating together with the driving lever and a link rod having a first end connected in an articulated manner by a pin to the transmission lever and a second end connected in an articulated manner by a pin to the pivoting element. Optionally, at a free end of the driving lever there is a roller mounted in a rotational manner about a vertical axis, and this roller is insertable in a groove of an operating element arranged in the filling station. The operating element is moved by a linear actuator, for example in a direction perpendicular to the advancing direction, for moving the driving lever between a closing position and an opening position.

Preferably, the gripper-holding carriage further comprises a locking mechanism immobilizing the left and right gripper arms in the closing position, and the locking mechanism is associated with an unlocking lever mounted in a rotational manner in the base structure, such that when the unlocking lever is operated, the locking mechanism is released allowing the movements of the left and right gripper arms.

In one embodiment, the locking mechanism comprises a brake disc, a brake shoe, a locking lever and an elastic element. The brake disc rotates together with the pivoting element and has a friction surface coaxial with the second vertical axis. The locking lever is mounted in the base structure in a rotational manner about a third vertical axis. The brake shoe is fixed to the locking lever and facing the friction surface of the brake disc. The elastic element is connected to the base structure and to the locking lever and biases the locking lever and brake shoe towards the friction surface of the brake disc. The aforementioned unlocking lever rotates together with the locking lever about the third vertical axis. Optionally, at a free end of the unlocking lever a roller is mounted in a rotational manner about a vertical axis, and this roller engages an actuating element, such as a stationary linear cam, for example, arranged in the filling station.

When the gripper-holding carriage reaches the filling station, first the actuating element moves the unlocking lever, the locking lever and the brake shoe to a release position against a force exerted by the elastic element, and then the linear actuator moves the operating element, the driving lever and the left and right gripper arms from the closing position to the opening position and from the opening position back to the closing position. When the gripper-holding carriage leaves the filling station, the actuating element stops acting on the unlocking lever and the elastic element returns the unlocking lever, the locking lever and the brake shoe to the locking position.

In one embodiment, each gripper of the pairs of left and right grippers comprises a fixed jaw, a movable jaw, an elastic element and a release lever. The fixed jaw is fixed to the corresponding left gripper arm or right gripper arm. The movable jaw is mounted in the corresponding left gripper arm or right gripper arm in a rotational manner about a horizontal axis parallel to the advancing direction. The elastic element is arranged such that it biases the movable jaw towards a holding position in which the movable jaw cooperates with the fixed jaw. Projecting from the movable jaw there is a release lever which can be operated for moving the movable jaw to a release position against a force exerted by the elastic element.

In one embodiment, each of the gripper-holding carriages further comprises one or more pairs of additional left and right gripper arms, left proximal and distal connecting rods and right proximal and distal connecting rods.

The pairs of additional left and right gripper arms are perpendicular to the advancing direction and are arranged between the left and right gripper arms. The additional left and right gripper arms have respective left and right proximal ends slidingly coupled to the proximal horizontal guide and respective left and right distal ends slidingly coupled to the distal horizontal guide.

The two or more pairs of additional left and right grippers are mounted in the additional left and right gripper arms. The grippers of these pairs of additional left and right grippers are similar to the grippers of the pairs of left and right grippers described above and can be operated for holding, in cooperation with the pairs of left and right grippers of the left and right gripper arms, two or more parallel rows of flexible packages, each row including two or more flexible packages arranged in parallel.

The left proximal end of the left gripper arm and the left proximal ends of all the additional left gripper arms are connected to one another by the left proximal connecting rods. The left distal end of the left gripper arm and the left distal ends of all the additional left gripper arms are connected to one another by the left distal connecting rods. The right proximal end of the right gripper arm and the right proximal ends of all the additional right gripper arms are connected to one another by the right proximal connecting rods. The right distal end of the right gripper arm and the right distal ends of all the additional right gripper arms are connected to one another by the right distal connecting rods.

The left and right proximal and distal connecting rods are essentially rigid and preferably parallel to the advancing direction. Thus, the movements imparted to the left and right gripper arms by the driving mechanism are transmitted by the left and right proximal and distal connecting rods to the additional left and right gripper arms for adopting an opening position in which the upper openings of the flexible packages supported by the gripper-holding carriage are open and a closing position in which the upper openings of the flexible packages supported by the gripper-holding carriage are closed.

BRIEF DESCRIPTION OF THE DRAWINGS

The foregoing and other features and advantages will be better understood from the following detailed description of several merely illustrative and non-limiting embodiments with reference to the attached drawings, in which:

FIG. 6 is a partially sectioned side view of the gripper-holding carriage with the grippers open;

FIG. 7 is an enlarged cross-section view taken along plane VII-VII of FIG. 3;

FIG. 8 is a partially sectioned rear view of the gripper-holding carriage;

DETAILED DESCRIPTION OF EXEMPLARY EMBODIMENTS

Figure 1:
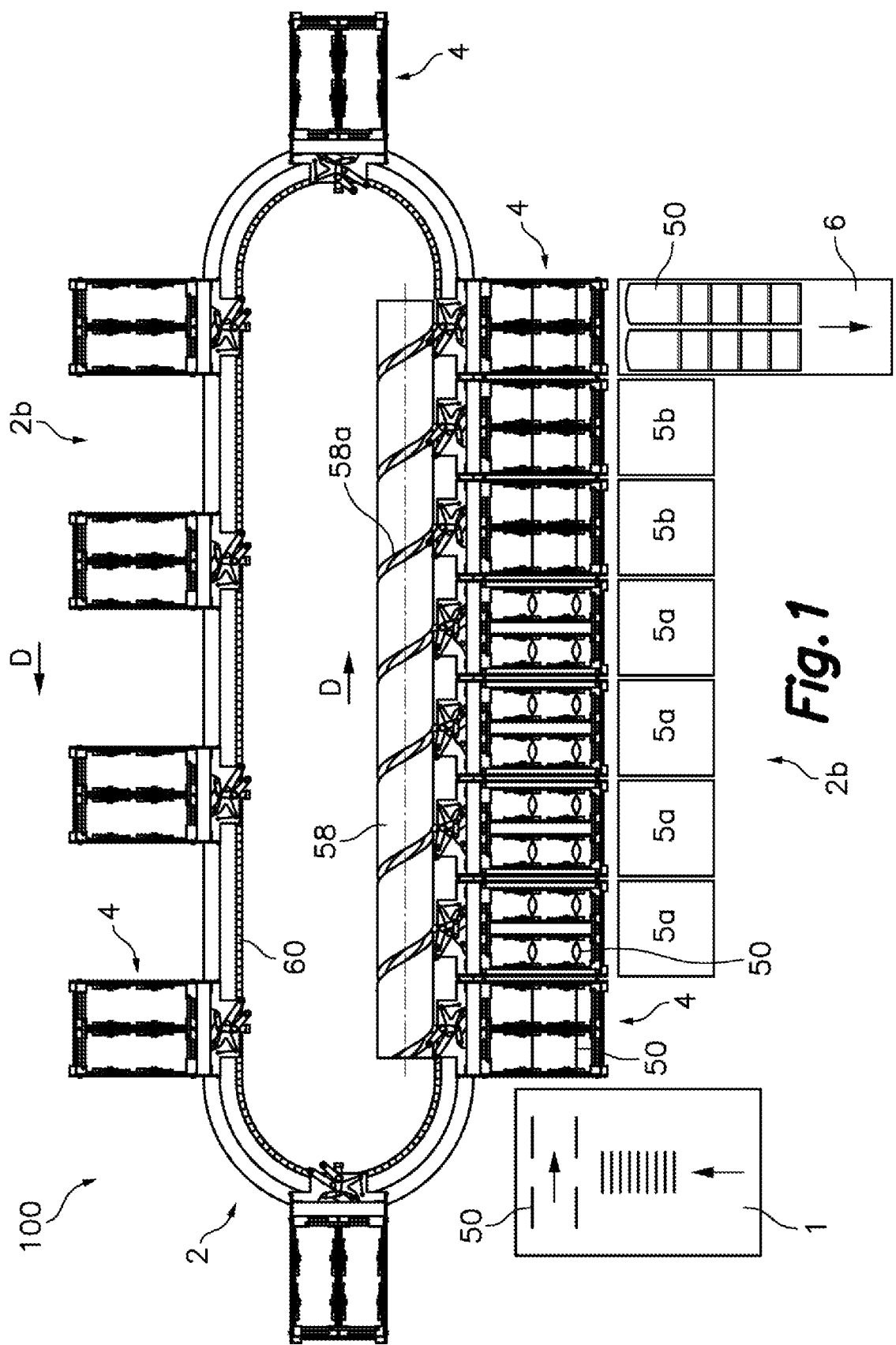
FIG. 1 is a schematic plan view of a horizontal-type automatic packaging machine according to an embodiment of the present invention.
Figure 2:
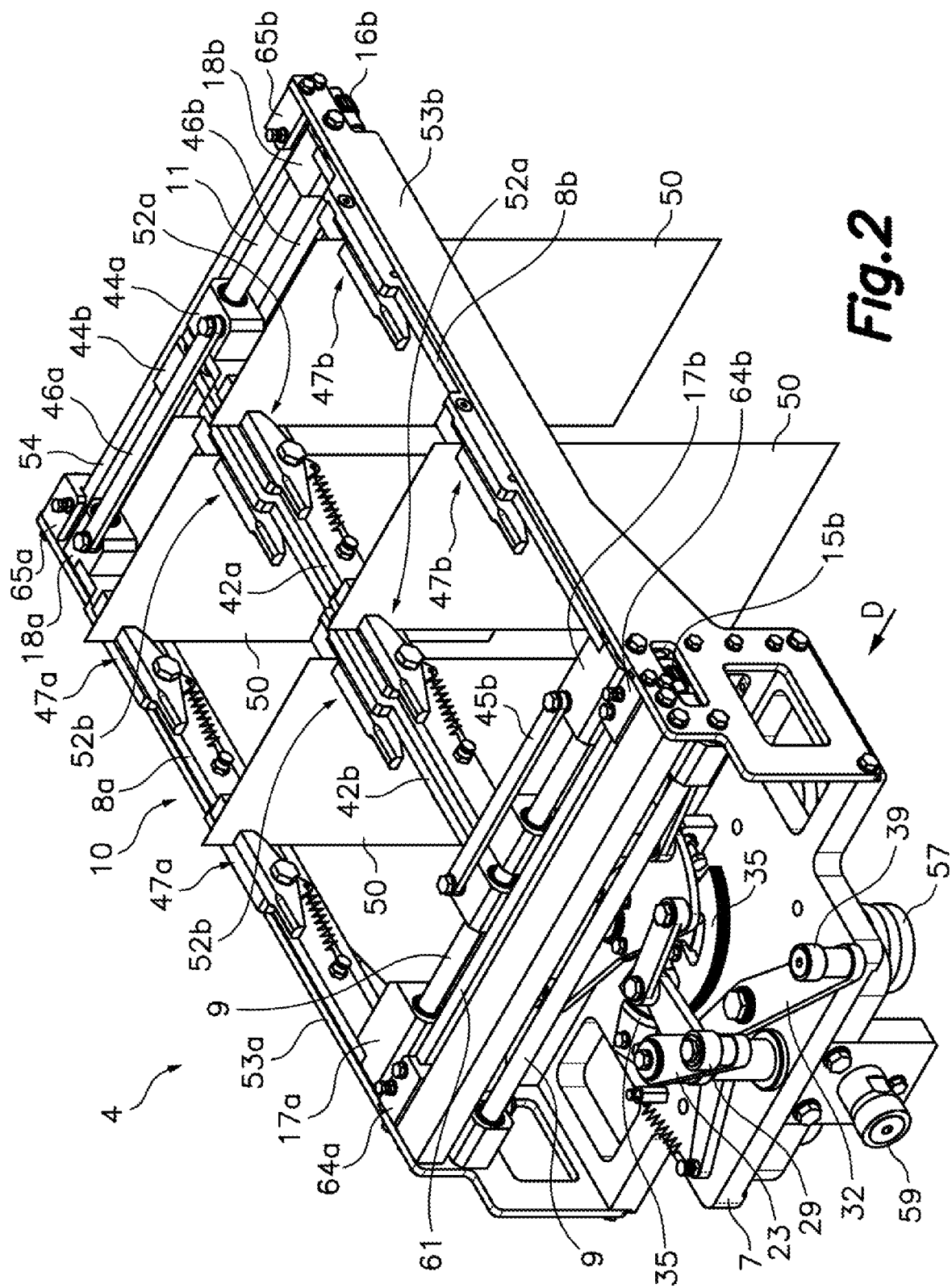
FIG. 2 is a perspective view of a gripper-holding carriage of the automatic packaging machine of FIG. 1, including gripper arms supporting flexible packages in a closing position.
Figure 3:
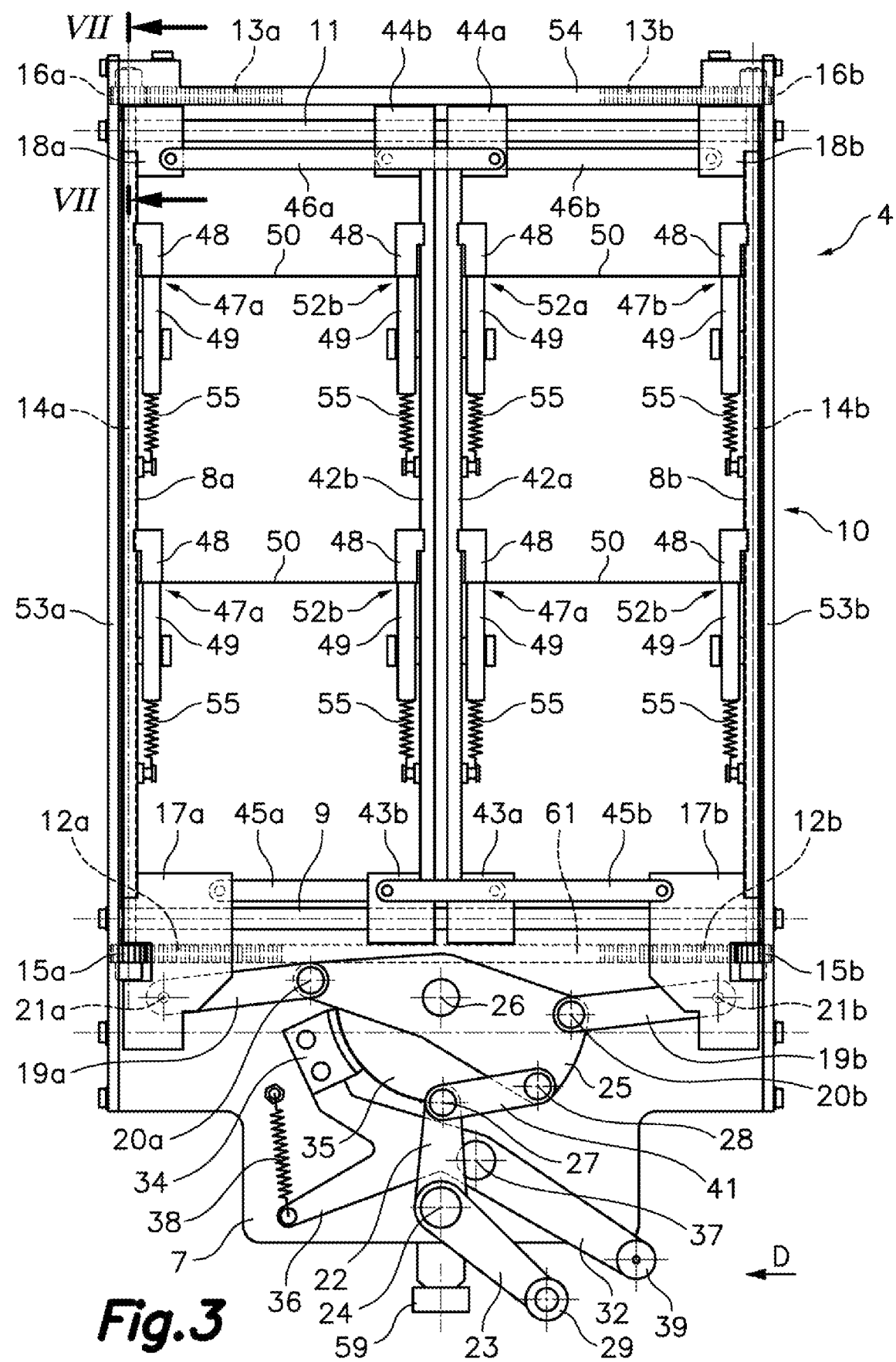
FIG. 3 is a schematic top plan view of the gripper-holding carriage of FIG. 2 with the gripper arms supporting the flexible packages in the closing position.

Referring first to FIG. 1, reference sign 100 generally designates a horizontal-type automatic packaging machine comprising a conveyor 2 moving a plurality of gripper-holding carriages 4 in an advancing direction D along a closed path having a working section 2a and a return section 2b. In the illustrated example, the conveyor 2 is a carousel-type conveyor and includes a track 56 defining the closed path and to which there are slidingly coupled the gripper-holding carriages 4, a barrel cam 58 provided with a cam groove 58a to which gripper-holding carriages 4 are coupled for conveying the gripper-holding carriages 4 along the working section 2a, and a return conveyor 60, comprising a roller chain, for example, for conveying the gripper-holding carriages 4 along the working section 2b.

The packaging machine 100 further includes a package supplying unit 1 supplying empty flexible packages 50 to the gripper-holding carriages 4 at the beginning of the working section 2a, a plurality of filling stations 5a and at least one sealing station 5b filling and sealing the flexible packages 50, respectively, in the working section 2a, and an output unit 6 receiving the filled and sealed flexible packages 50 which are delivered by the gripper-holding carriages 4 at the end of the working section 2a.

The package supplying unit 1, the filling stations 5a, the sealing stations 5b, and the output unit 6 are only symbolically depicted in FIG. 1. The package supplying unit 1 can be configured for supplying empty flexible packages 50 previously produced and loaded to the unit or can include a package production device configured for producing empty flexible packages 50 from sheet of wound flexible material and supplying them to the gripper-holding carriages 4 according to a well-known technique.

FIGS. 2 to 8 show one of the gripper-holding carriages 4 of FIG. 1. The gripper-holding carriage 4 comprises a base structure 7 provided with wheels 57 which are coupled to the track 56 of the conveyor 2 and a cam follower 59 which is coupled to the cam groove 58a of the barrel cam 58 of the conveyor 2. The base structure 7 comprises an extension frame 10 including two left and right longitudinal members 53a, 53b having proximal ends fixed to the base structure 7 and a distal crosspiece 54 fixed to distal ends of the left and right longitudinal members 53a, 53b. Proximal horizontal guides 9 are fixed to the base structure 7 parallel to the advancing direction D, and the extension frame 10 supports at least one distal horizontal guide 11 parallel to the proximal horizontal guides 9 and to the advancing direction D.

The gripper-holding carriage 4 has a pair of left and right gripper arms 8a, 8b extending from the base structure 7 perpendicular to the advancing direction D and located adjacent to inner sides of the left and right longitudinal members 53a, 53b of the extension frame 10 and a pair of additional left and right gripper arms 42a, 42b perpendicular to the advancing direction D arranged between the left and right gripper arms 8a, 8b. The additional right gripper arm 42b is facing the left gripper arm 8a and the additional left gripper arm 42a is facing the right gripper arm 8b.

The left and right gripper arms 8a, 8b have respective left and right proximal ends 17a, 17b slidingly coupled to the proximal horizontal guides 9 and respective left and right distal ends 18a, 18b slidingly coupled to the distal horizontal guide 11. The additional left and right gripper arms 42a, 42b have respective left and right proximal ends 43a, 43b slidingly coupled to the proximal horizontal guide 9 and respective left and right distal ends 44a, 44b slidingly coupled to the distal horizontal guide 11.

In the illustrated embodiment, the left and right proximal ends 17a, 17b and the left and right distal ends 18a, 18b are formed by respective blocks fixed to the left and right gripper arms 8a, 8b. Similarly, the left and right proximal ends 43a, 43b and the left and right distal ends 44a, 44b are formed by respective blocks fixed to the additional left and right gripper arms 42a, 42b.

The left proximal and distal ends 17a, 18a of the left gripper arm 8a are connected to the left proximal and distal ends 43a, 44a of the additional left gripper arm 42a by respective left proximal and distal connecting rods 45a, 46a, and the right proximal and distal ends 17b, 18b of the right gripper arm 8b are connected to the right proximal and distal ends 43b, 44b of the additional right gripper arm 42b by respective right proximal and distal connecting rods 45b, 46b.

Two pairs of left and right grippers 47a, 47b are mounted in the left and right gripper arms 8a, 8b, and two pairs of additional left and right grippers 52a, 52b are mounted in the additional left and right gripper arms 42a, 42b. The left grippers 47a cooperate with the additional right grippers 52b and the additional left grippers 52a cooperate with the right grippers 47b for holding two parallel rows of flexible packages 50 with two flexible packages 50 arranged in parallel in each row, rendering a total of four flexible packages 50 for each gripper-holding carriage 4.

As best shown in FIG. 6, each of the left and right grippers 47a, 47b and each of the additional left and right grippers 52a, 52b comprises a fixed jaw 48 fixed to the corresponding left and right gripper arm 8a, 8b or additional left and right gripper arm 42a, 42b, a movable jaw 49 mounted in the corresponding left and right gripper arm 8a, 8b or additional left and right gripper arm 42a, 42b in a rotational manner about a horizontal axis parallel to the advancing direction D, and an elastic element 55 connected to the movable jaw 49 and to the corresponding left and right gripper arm 8a, 8b or additional left and right gripper arm 42a, 42b such that the elastic element 55 biases the movable jaw 49 towards a holding position in which the movable jaw 49 cooperates with the fixed jaw 48.

The movable jaw 49 rotates together with a release lever 51 which can be operated for moving the movable jaw 49 to a release position against a force exerted by the elastic element 55. At the beginning and at the end of the working section 2a of the conveyor 2, there are pushers (symbolically depicted by means of arrows P in FIG. 6) pushing the release levers 51 downwards for moving the movable jaws 49 to the release position. Each flexible package 50 comprises two facing flexible walls and has a closed bottom, closed lateral edges, and an upper opening. Each pair of grippers formed by a left gripper 47a and an additional right gripper 52b or by an additional left gripper 52a and a right gripper 47b is configured and arranged for supporting a flexible package 50 by grabbing it by its opposite lateral edges in positions close to the upper opening.

Each gripper-holding carriage 4 includes a driving mechanism connected to the left and right proximal ends 17a, 17b of the left and right gripper arms 8a, 8b, and this driving mechanism comprises a mechanical movement transmission transmitting the movement made by the left and right proximal ends 17a, 17b of the left and right gripper arms 8a, 8b with respect to the base structure 7 to the respective left and right distal ends 18a, 18b of the left and right gripper arms 8a, 8b with respect to the extension frame 10.

This mechanical movement transmission comprises a pair of left and right proximal racks 12a, 12b fixed to the base structure 7 and arranged adjacent to the left and right proximal ends 17a, 17b of the left and right gripper arms 8a, 8b in positions parallel to the advancing direction D, and a pair of left and right distal racks 13a, 13b fixed to the extension frame 10 and arranged adjacent to the left and right distal ends 18a, 18b of the left and right gripper arms 8a, 8b in positions parallel to the advancing direction D.

In the embodiment shown, the left and right proximal racks 12a, 12b are formed in a proximal crosspiece 61 fixed to the base structure 7 and the left and right distal racks 13a, 13b are formed in the distal crosspiece 54 of the extension frame 10. Left and right proximal support blocks 64a, 64b and left and right distal support blocks 65a, 65b are fixed in the left and right longitudinal members 53a, 53b. The proximal crosspiece 61 is connected at its ends to the left and right proximal support blocks 64a, 64b by means of clamping screws and adjustment screws and the distal crosspiece 54 is connected at its ends to the left and right distal support blocks 65a, 65b by means of clamping screws and adjustment screws.

The mechanical movement transmission further comprises a pair of left and right transmission shafts 14a, 14b, which are installed in the left and right gripper arms 8a, 8b in a rotational manner about respective axes perpendicular to the advancing direction D, for example by means of friction bearings 62 (FIG. 7). The left transmission shaft 14a has fixed at its ends a left proximal pinion 15a and a left distal pinion 16a, which are meshed with the left proximal rack 12a and the left distal rack 13a, respectively. The right transmission shaft 14b has fixed at its ends a right proximal pinion 15b and a right distal pinion 16b which are meshed with the right proximal rack 12b and the right distal rack 13b, respectively. The left proximal and distal pinions 15a, 16a have a same diameter and the right proximal and distal pinions 15b, 16b have a same diameter.

The driving mechanism comprises a driving lever 23 mounted in the base structure 7 in a rotational manner about a first vertical axis 24. A primary transmission transmits the rotations of the driving lever 23 to a pivoting element 25 mounted in the base structure 7 in a rotational manner about a second vertical axis 26, and a secondary transmission converts the rotations of the pivoting element 25 into linear back and forth movements of the left and right gripper arms 8a, 8b along the proximal and distal horizontal guides 9, 11 between a closing position (FIG. 3), in which the paired gripper arms are relatively spaced out and the grippers support the flexible packages 50 with their flexible walls being tensed and upper openings closed, and an opening position (FIG. 4), in which the paired gripper arms are closer to one another and the grippers support the flexible packages 50 with their flexible walls being bent and their upper openings open.

The primary transmission comprises a transmission lever 22 rotating together with the driving lever 23 and a link rod 41 having a first end connected in an articulated manner by a pin 27 to the transmission lever 22 and a second end connected in an articulated manner by a pin 28 to the pivoting element 25. The secondary transmission comprises a pair of left and right link rods 19a, 19b having first ends connected in an articulated manner by respective first pins 20a, 20b to points of the pivoting element 25 located on opposite sides of the second vertical axis 26 and second ends connected in an articulated manner by respective second pins 21a, 21b to the left and right proximal ends 17a, 17b of the left and right gripper arms 8a, 8b.

In the embodiment shown, the first pins 20a, 20b are arranged equidistant from the second vertical axis 26 and on a plane containing the second vertical axis 26. The second pins 21a, 21b are also arranged on a plane containing the second vertical axis 26.

Figure 4:
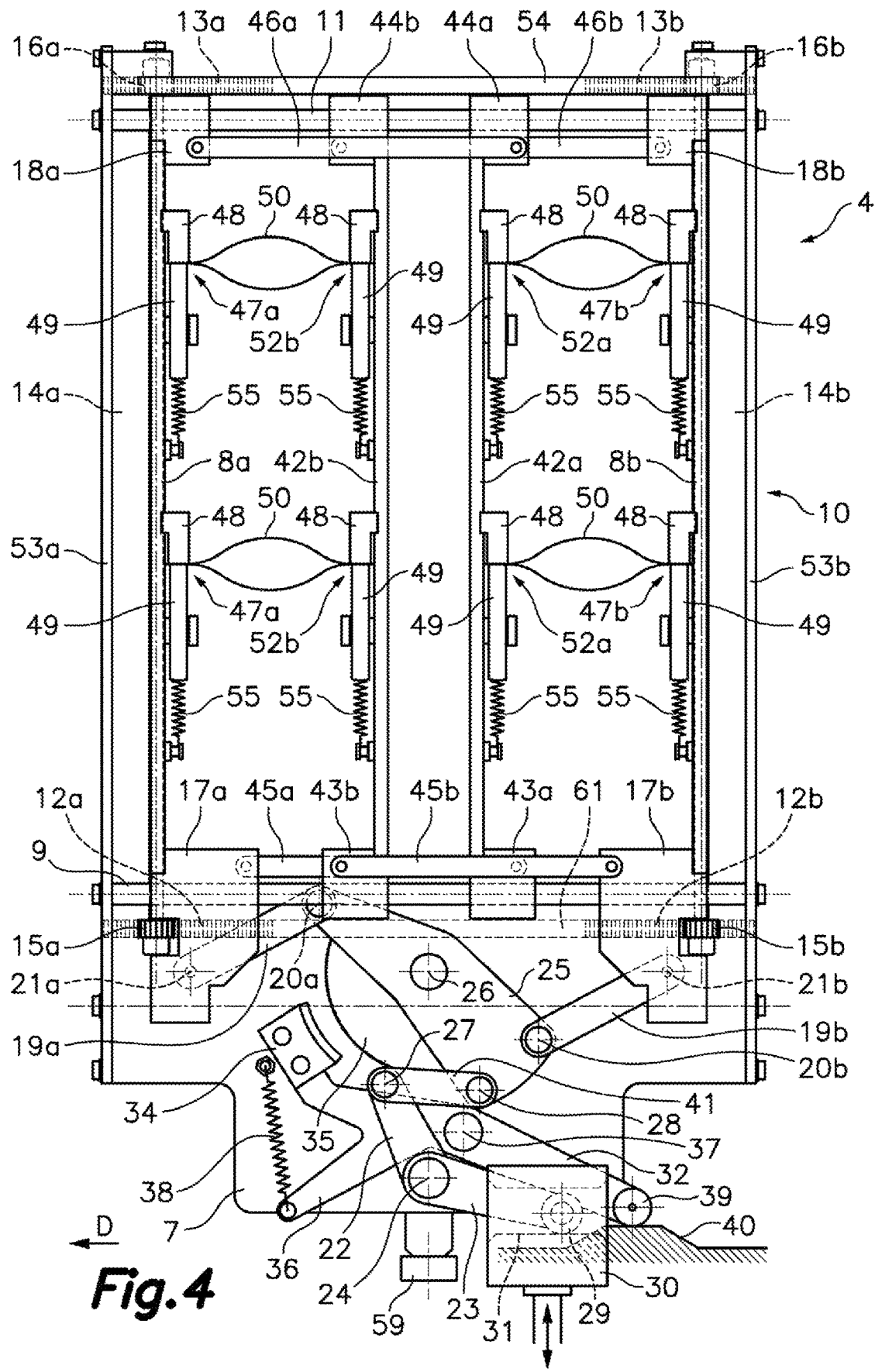
FIG. 4 is a schematic top plan view of the gripper-holding carriage with the gripper arms supporting the flexible packages in an opening position.
Figure 5:
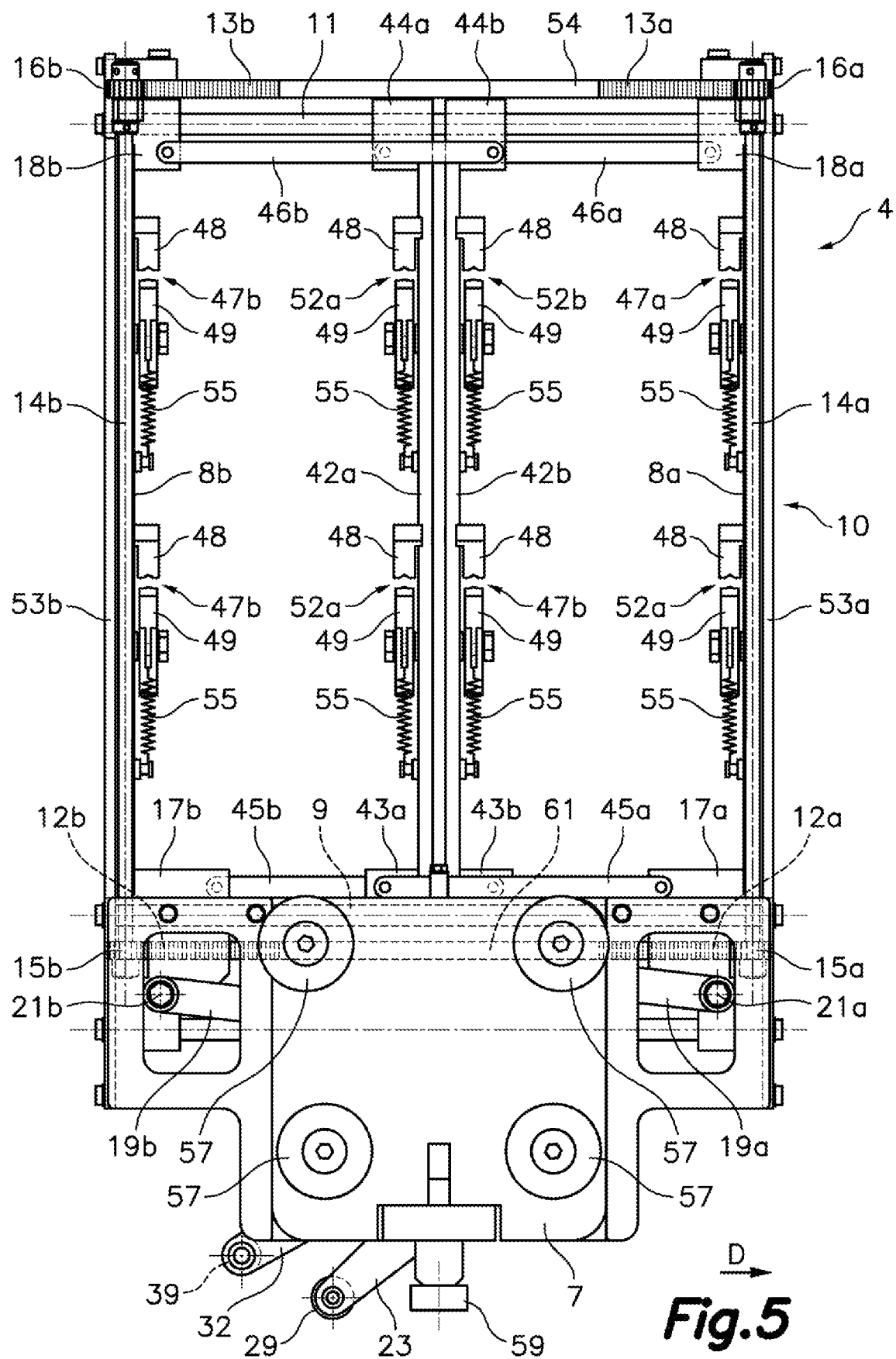
FIG. 5 is a bottom plan view of the gripper-holding carriage.

The driving lever 23 has a free end in which a roller 29 is mounted in a rotational manner about a vertical axis. When a gripper-holding carriage 4 moved by the conveyor 2 reaches a filling station 5a, the roller 29 is inserted in a groove 31 formed in an operating element 30 arranged in the filling station 5a (FIG. 4). Then the operating element 30 is moved by a linear actuator (not shown) in a direction perpendicular to the advancing direction D, and the driving lever 23 is moved with it between a closing position and an opening position, and accordingly the driving mechanism moves the left and right gripper arms 8a, 8b and the additional left and right gripper arms 42a, 42b in opposite directions in relation to the base structure 7 and the extension frame 10, moving one towards the other to the opening position for opening the flexible packages 50 and moving one away from the other to the closing position for closing the flexible packages 50.

To prevent the left and right gripper arms 8a, 8b and the additional left and right gripper arms 42a, 42b from moving in an unwanted manner along the proximal and distal horizontal guides 9, 11 due to the effect of inertias during translations of the gripper-holding carriages from one station to another, each of the gripper-holding carriages 4 further comprises a locking mechanism immobilizing the left and right gripper arms 8a, 8b and the additional left and right gripper arms 42a, 42b in the closing position.

The locking mechanism comprises a brake disc 34 rotating together with the pivoting element 25 and having a friction surface coaxial with the second vertical axis 26. A locking lever 36 is mounted in the base structure 7 in a rotational manner about a third vertical axis 37. There is fixed in this locking lever 36 a brake shoe 35, which is facing the friction surface of the brake disc 34. An elastic element 38, which is connected to the base structure 7 and to the locking lever 36, biases the locking lever 36 and the brake shoe 35 towards a locking position (FIG. 3), in which the brake shoe 35 is pressed by a force exerted by the elastic element 38 against the friction surface of the brake disc 34, so the driving mechanism is locked and the left and right gripper arms 8a, 8b and the additional left and right gripper arms 42a, 42b are immobilized.

The locking lever 36 rotates together with an unlocking lever 32, which has a free end in which a roller 39 is mounted in a rotational manner about a vertical axis. When a gripper-holding carriage 4 moved by the conveyor 2 reaches a filling station 5a, the roller 39 engages an actuating element arranged in the filling station 5a, and the actuating element moves the unlocking lever 32 together with the locking lever 36 and the brake shoe 35 to a release position (FIG. 4) against the force exerted by the elastic element 38, so the brake shoe 35 is separated from the friction surface of the brake disc 34 and the locking mechanism is released. In the embodiment shown in FIG. 4, the actuating element is a stationary linear cam 40 on which the roller 39 rolls.

In an alternative embodiment not shown, the left and right gripper arms 8a, 8b and the additional left and right gripper arms 42a, 42b have more than two pairs of left and right grippers 47a, 47b and more than two pairs of additional left and right grippers 52a, 52b, respectively, so the gripper-holding carriage 4 is capable of supporting two parallel rows of flexible packages with more than two flexible packages arranged in parallel in each row.

In another alternative embodiment not shown, the gripper-holding carriage includes more than one pair of additional left and right gripper arms 42a, 42b slidingly coupled in the proximal and distal horizontal guides 9, 11. In this case, the left proximal and distal ends 43a, 44a of all the additional left gripper arms 42a are connected to one another by respective additional left proximal and distal connecting rods, and the right proximal and distal ends 43b, 44b of all the additional right gripper arms 42b are connected to one another by respective additional right proximal and distal connecting rods. Furthermore, the left and right gripper arms 8a, 8b and the additional left and right gripper arms 42a, 42b can optionally have more than two pairs of left and right grippers 47a, 47b and more than two pairs of additional left and right grippers 52a, 52b, respectively, so the gripper-holding carriage 4 is capable of supporting more than two parallel rows of flexible packages with more than two flexible packages arranged in parallel in each row.

Figure 9:
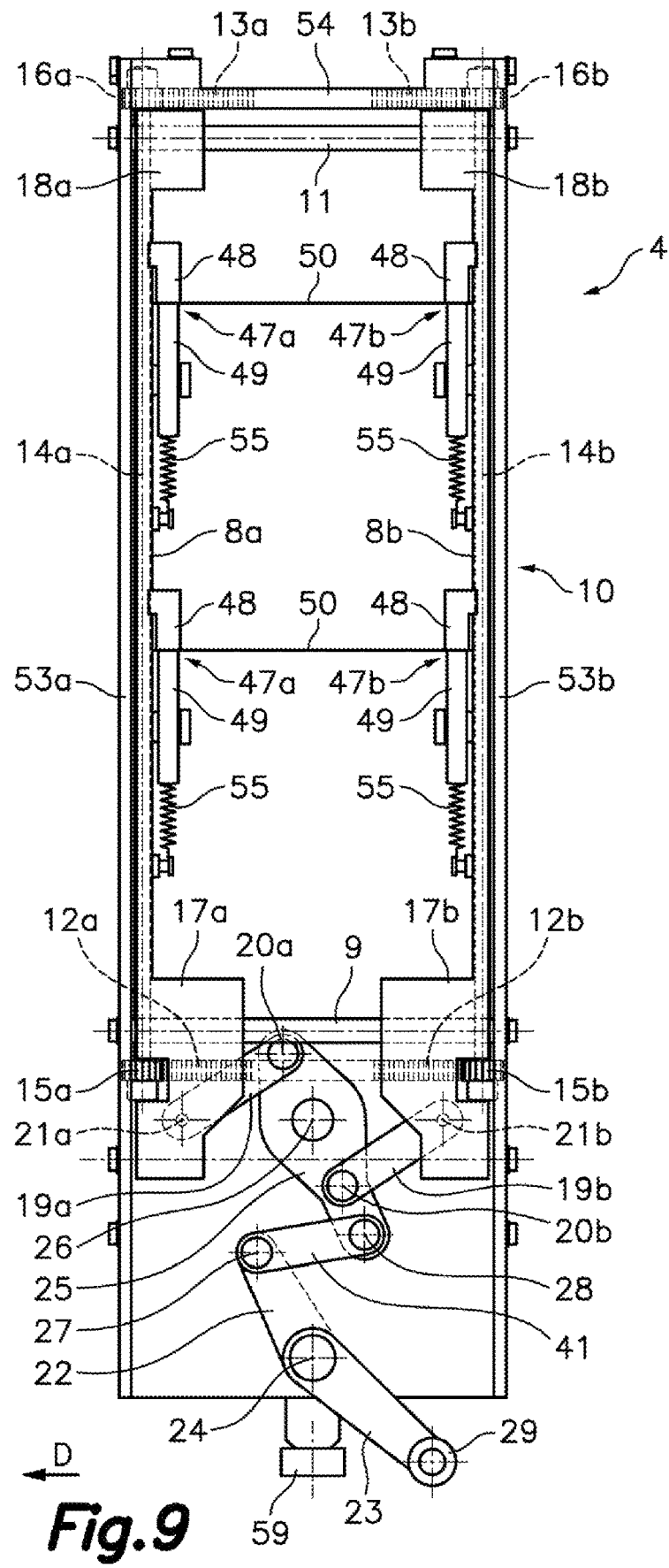
FIG. 9 is a schematic top plan view of a gripper-holding carriage of a horizontal-type automatic packaging machine according to another embodiment of the present invention, including gripper arms supporting flexible packages in a closing position.
Figure 10:
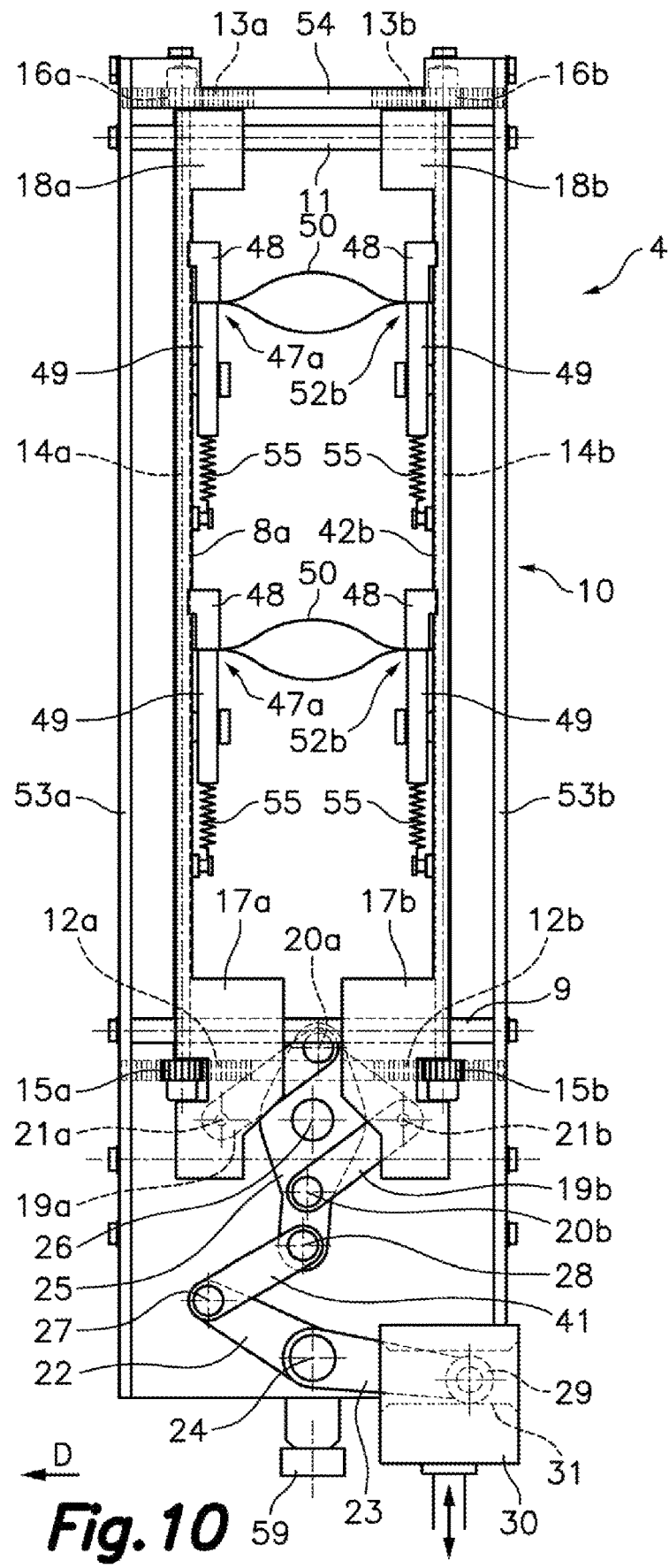
FIG. 10 is a schematic top plan view of the gripper-holding carriage of FIG. 9 with the gripper arms supporting the flexible packages in the opening position.

FIGS. 9 and 10 show a gripper-holding carriage 4 according to another alternative embodiment of the present invention, in a closing position and in an opening position, respectively. The gripper-holding carriage 4 of FIGS. 9 and 10 is similar in its entirety to the gripper-holding carriage 4 described above in relation to FIGS. 2 to 8 except in that here the additional left and right gripper arms 42a, 42b and their corresponding pairs of additional left and right grippers 52a, 52b have been omitted, so the left and right gripper arms 8a, 8b and their corresponding pairs of left and right grippers 47a, 47b are arranged for supporting a single row of two flexible packages 50 arranged in parallel.

The locking mechanism has also been omitted in the gripper-holding carriage 4 of FIGS. 9 and 10, although alternatively the gripper-holding carriage 4 of FIGS. 9 and 10 could be equipped with a locking mechanism similar to the one described above in relation to FIGS. 2 to 8.

Optionally, the left and right gripper arms 8a, 8b of the gripper-holding carriage 4 of FIGS. 9 and 10 could have more than two pairs of left and right grippers 47a, 47b, so the gripper-holding carriage 4 could support a single row of more than two flexible packages 50 arranged in parallel.

The scope of the present invention is defined in the attached claims.

The invention claimed is:

1. A horizontal-type automatic packaging machine comprising:
    a conveyor moving a plurality of gripper-holding carriages in an advancing direction along a closed path having a working section and a return section;
    a package supplying unit supplying empty flexible packages to said gripper-holding carriages at the beginning of said working section;
    at least one filling station filling the flexible packages and at least one sealing station sealing the flexible packages, in the working section; and
    an output unit receiving the filled and sealed flexible packages delivered by the gripper-holding carriages at the end of the working section;
    wherein each of the gripper-holding carriages comprises:
    a base structure connected to the conveyor;
    a pair of left and right gripper arms extending from said base structure perpendicular to said advancing direction, the left gripper arm having a left proximal end and a left distal end, and the right gripper arm having a right proximal end and a right distal end, the left and right proximal ends being slidingly coupled to at least one proximal horizontal guide, parallel to the advancing direction, fixed to the base structure;

at least two pairs of left and right grippers mounted in the left and right gripper arms, said left and right grippers being operable for holding at least two flexible packages arranged in parallel; and a driving mechanism connected to said left and right proximal ends of the left and right gripper arms and moving the left and right gripper arms in opposite directions in relation to the base structure, moving one closer to the other for opening the flexible packages and moving one away from the other for closing the flexible packages, wherein:

the base structure comprises an extension frame supporting at least one distal horizontal guide parallel to the advancing direction;

said left and right distal ends of the left and right gripper arms are slidingly coupled to said distal horizontal guide; and said driving mechanism comprises a mechanical movement transmission transmitting adapted to transmit the movement of the left and right proximal ends of the left and right gripper arms to the respective left and right distal ends of the left and right gripper arms.

2. The machine according to claim 1, wherein said mechanical movement transmission comprises:

a pair of left and right proximal racks fixed to the base structure in positions parallel to the advancing direction and adjacent to the left and right proximal ends of the left and right gripper arms;

a pair of left and right distal racks fixed to the extension frame in positions parallel to the advancing direction and adjacent to the left and right distal ends of the left and right gripper arms;

a pair of left and right transmission shafts installed in the left and right gripper arms in a rotational manner about respective axes perpendicular to the advancing direction;

a pair of left and right proximal pinions fixed respectively to said left and right transmission shafts and meshing with said left and right proximal racks;

and a pair of left and right distal pinions fixed respectively to said left and right transmission shafts and meshing with said left and right distal racks.

3. The machine according to claim 2, wherein the left proximal and distal pinions have a same diameter and the right proximal and distal pinions have a same diameter.

4. The machine according to claim 1, wherein said driving mechanism comprises a driving lever mounted in the base structure in a rotational manner about a first vertical axis, a primary transmission adapted to transmit a rotation of said driving lever to a pivoting element mounted in the base structure in a rotational manner about a second vertical axis, and a secondary transmission adapted to convert a rotation of said pivoting element into linear back and forth movements of the left and right gripper arms along the proximal and distal horizontal guides between a closing position and an opening position.

5. The machine according to claim 4, wherein said secondary transmission comprises a pair of left and right link rods having first ends connected in an articulated manner by respective first pins to points of the pivoting element located on opposite sides of said second vertical axis and second ends connected in an articulated manner by respective second pins to the left and right proximal ends of the left and right gripper arms.

6. The machine according to claim 4, wherein said primary transmission comprises a transmission lever rotating together with the driving lever, and a link rod having a first end connected in an articulated manner by a pin to said transmission lever, and a second end connected in an articulated manner by a pin to the pivoting element.

7. The machine according to claim 4, wherein a roller is mounted at a free end of the driving lever in a rotational manner about a vertical axis, said roller being insertable in a groove of an operating element arranged in said filling station, and said operating element is moved by a linear actuator for moving the driving lever between a closing position and an opening position.

8. The machine according to claim 4, wherein each of the gripper-holding carriages further comprises a locking mechanism immobilizing the left and right gripper arms in said closing position, said locking mechanism being releasable by acting on an unlocking lever mounted in a rotational manner in the base structure.

9. The machine according to claim 8, wherein the locking mechanism comprises a brake disc rotating together with the pivoting element and having a friction surface coaxial with said second vertical axis, a brake shoe facing said friction surface of the brake disc and fixed to a locking lever mounted in the base structure in a rotational manner about a third vertical axis, and an elastic element connected to the base structure and to said locking lever and biasing the locking lever and the brake shoe towards the friction surface of the brake disc, and wherein said unlocking lever rotates together with the locking lever.

10. The machine according to claim 9, wherein a roller is mounted at a free end of the unlocking lever in a rotational manner about a vertical axis, said roller being coupleable to an actuating element arranged in said filling station, and said actuating element moves the unlocking lever, the locking lever and the brake shoe to a release position against a force exerted by said elastic element.

11. The machine according to claim 9, wherein the actuating element is a stationary linear cam.

12. The machine according to claim 1, wherein each gripper of said pairs of left and right grippers comprises a fixed jaw fixed to one of the left and right gripper arms, a movable jaw mounted in one of the left and right gripper arms in a rotational manner about a horizontal axis parallel to the advancing direction, and an elastic element biasing said movable jaw towards a holding position in cooperation with said fixed jaw, the movable jaw having a release lever that can be operated for moving the movable jaw to a release position against a force exerted by said elastic element.

13. The machine according to claim 1, wherein the extension frame of the base structure comprises two left and right longitudinal members having proximal ends fixed to the base structure and a distal crosspiece fixed to distal ends of said left and right longitudinal members.

14. The machine according to claim 1, wherein each of the gripper-holding carriages further comprises:

at least one pair of additional left and right gripper arms perpendicular to the advancing direction arranged between the left and right gripper arms, said additional left and right gripper arms having respective left and right proximal ends slidingly coupled to the proximal horizontal guide and respective left and right distal ends slidingly coupled to the distal horizontal guide;

at least two pairs of additional left and right grippers mounted in the additional left and right gripper arms, said additional left and right grippers being able to be operated for holding, in cooperation with the pairs of left and right grippers of the left and right gripper arms, at least two parallel rows of flexible packages with at least two flexible packages arranged in parallel in each row;

left proximal and distal connecting rods connecting the left proximal and distal ends of the left gripper arm to the left proximal and distal ends of each additional left gripper arm; and right proximal and distal connecting rods connecting the right proximal and distal ends of the right gripper arm to the right proximal and distal ends of each additional right gripper arm.

15. The machine according to claim 14, wherein each gripper of said pairs of additional left and right grippers comprises a fixed jaw fixed to one of the additional left and right gripper arms, a movable jaw mounted in one of the additional left and right gripper arms in a rotational manner about a horizontal axis parallel to the advancing direction, and an elastic element biasing said movable jaw towards a holding position in cooperation with said fixed jaw, the movable jaw having a release lever that can be operated for moving the movable jaw to a release position against a force exerted by said elastic element.

\* \* \* \* \*

UNITED STATES PATENT AND TRADEMARK OFFICE
CERTIFICATE OF CORRECTION

PATENT NO.         : 11,097,864 B2
APPLICATION NO.    : 16/348525
DATED              : August 24, 2021
INVENTOR(S)        : Mora Flores et al.

Page 1 of 1

It is certified that error appears in the above-identified patent and that said Letters Patent is hereby corrected as shown below:

In the Claims

Column 11 Lines 19-20 Claim 1 reads:
"said driving mechanism comprises a mechanical movement transmission transmitting adapted to transmit the [...]"

Should have read:
"said driving mechanism comprises a mechanical movement transmission adapted to transmit the [...]"

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*